May 19, 1959
E. K. RALSTON
2,887,140
TIRE CLAMP
Filed Oct. 26, 1954
2 Sheets-Sheet 1
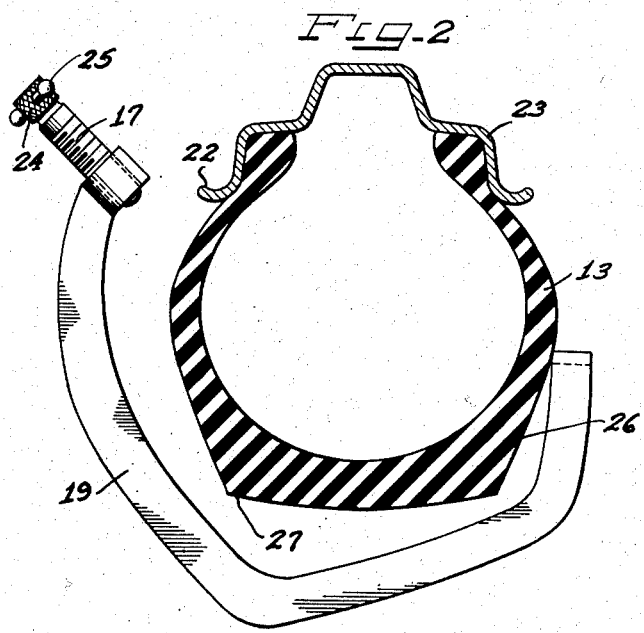
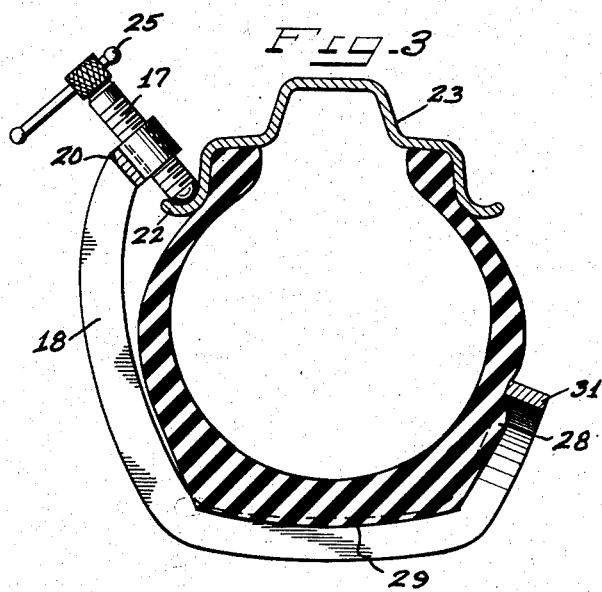
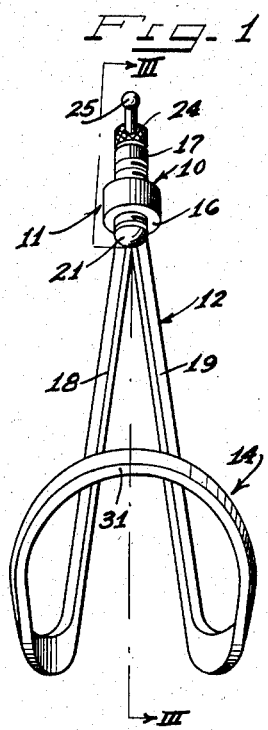
Inventor
ELDON K. RALSTON
By Hill, Sherman, Meroni, Gross & Simpson
Attys.

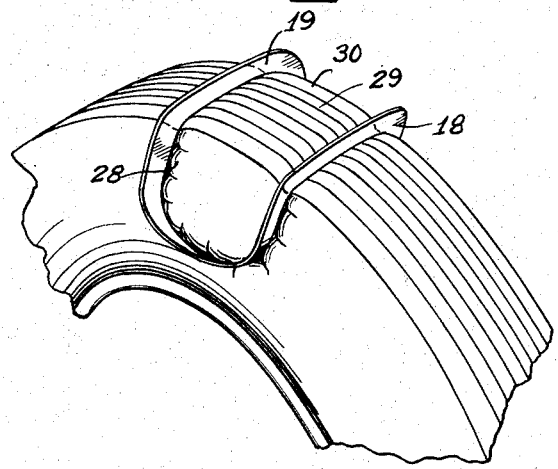
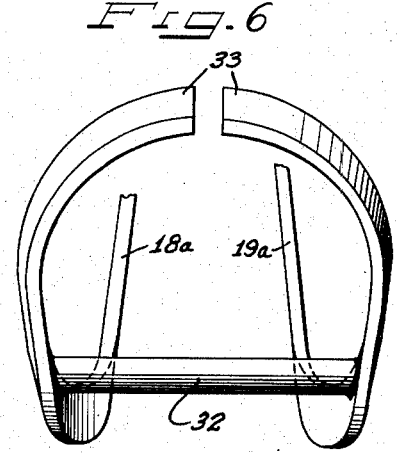
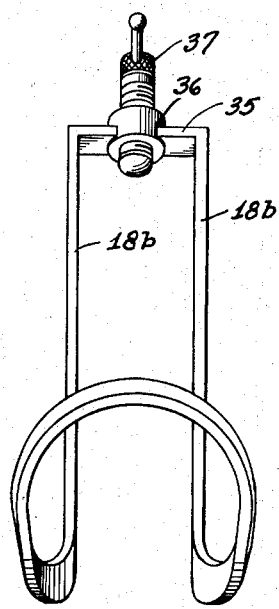
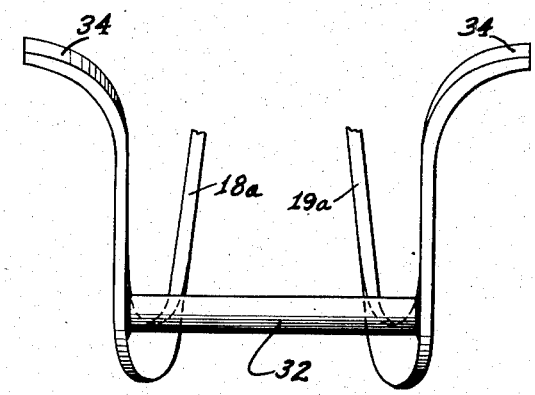

United States Patent Office 2,887,140
Patented May 19, 1959

2,887,140

TIRE CLAMP

Eldon K. Ralston, Cleveland, Ohio, assignor to Thompson Ramo Wooldridge Inc., a corporation of Ohio Application October 26, 1954, Serial No. 464,858

3 Claims. (Cl. 152—228)

This invention relates to a traction clamp or cleat for tires and specifically, deals with a C-shaped tire lug for transversely engaging around a tire tread and having one end formed with a bight for indenting and gripping one side wall of the tire, the other end of the tire lug on the opposite side of the tire being extended along the tire side wall and having clamping means for engaging the tire rim and for forcing and depressing the bight into the material of the tire wall engaged thereby.

The instant invention involves a tire lug or cleat of a type that may be very easily installed on and removed from a tire and wheel by mere access to the outer side of the vehicle wheel thereby eliminating the heretofore necessary dirty operation of hooking cleats or lugs around wheels or on the axially inner sides of the wheel rim of the tire as is common practice with the conventional tire lugs.

The construction of this invention provides a tire lug gripping surface capable of fixed seating on even a slippery tire casing and capable of resisting the tremendous impacts which are developed by a rotating vehicle tire. The underlying reason why the instant tire lug is advantageous resides in the construction of the tire tread and side wall gripping portion of the tire cleat or lug. These portions when mounted on the tire form bulges in a segment of the tread and side wall of the tire which lock the lug against movement on the tire.

A feature of the present invention is the provision of bulge forming means on one terminal end of the tire lug, the bulge forming means being so shaped as to be readily depressible into the tire tread and side wall, and when depressed, being capable of firmly gripping a segment of the tire tread and side wall to reduce to a minimum any propensity of the tire clamp to move circumferentially and diagonally with a rotating tire.

An object of this invention is to provide a device for increasing the traction capacity of a wheel which device is readily clamped on the wheel under the load of the assembly and is firmly held in clamped relation on the assembly until manually released.

A further object of this invention is to provide a tire clamp for increasing the traction of a tire which is easily applied to a tire and wheel assembly and is firmly clamped in position under the load of the assembly.

A specific object of the invention is to provide a tire clamp which utilizes tire pressure to hold the clamp in locked position on a wheel.

Other and further objects and features of this invention will be apparent to those skilled in the art from the annexed sheets of drawings which, by way of several embodiments of the invention, illustrate examples of the invention.

On the drawings:

Figure 1 is an end elevational view of my tire lug representing the preferred form of the instant invention;

Figure 2 is a side elevational view of my tire lug showing how the same is to be applied to the tire and tire rim of a wheel;

Figure 3 is an enlarged cross-sectional view taken on the lines III—III of Figure 1, relative to the clamp, showing how my tire lug appears after being installed on a wheel and tire assembly;

Figure 4 is a fragmentary perspective view showing how the terminal or inside end of my novel tire lug grips into the tire when secured to the wheel;

Figure 5 is an end elevational view, similar to that of Figure 1, but showing a modified form of my invention;

Figure 6 is a fragmentary view of the inside or terminal end portion of a further modified form of my invention;

Figure 7 is an enlarged fragmentary end elevational view, similar to that of Figure 6, showing a still further modification.

As shown on the drawings:

It will be understood that the preferred embodiment of the instant invention is shown in Figures 1, 2, 3 and 4.

The tire cleat or lug 10 shown in these figures is shaped, as viewed from the side, as in Figures 2 and 3, in the form of a C and comprises essentially three integral parts, namely, the clamping means 11 positioned on one terminal end of the clamp 10, an intermediate curve or generally C-shaped portion 12 approximating the cross-sectional curvature of the tire 13 and formed by divergent legs, 18, 19 extending from the clamping means and joining each other at the other terminal end of the C in a large loop, or bight, 14 constituting the all-important bulge forming means.

The cleat proper is made of a strip of rigid self-sustaining generally flat spring steel wire or other suitable rigid material, the thin edge of which is formed to contact the tire. The strip of wire is butt-welded to a small loop end 16 and the loop formed as shown at an angle to extend inward from the adjacent legs of the clamp. The loop end 16, is internally threaded for receiving a clamping screw 17 and the two legs or straps 18 and 19 are riveted or welded together at 20 (Fig. 3) to close the loop.

As will best be seen in Figure 1, the clamping screw 17 has a ball end 21 of a diameter which substantially matches the outer groove formed by the junction between the axially extending rim lip 22 (Figure 3) and the outermost radially extending portion of the steel tire rim 23. In addition, this clamping screw 17, which is made of hardened steel, is provided with a drilled head 24 and a sliding handle 25, as shown in Figure 1 for tightening and loosening of the cleat 10.

The tire cleat 10 may be readily installed on the tire 13 of a vehicle when the tire, due to being stuck in mud or snow or the like, requires added traction in order to free itself. This is done by slipping the looped end 14 of the cleat around to the rear side of the tire so that it abuts the inside radially extending tire side wall 26 (Fig. 2). Thereafter, the clamping means 11 is brought into alignment with the tire rim 23 and the clamping screw 17 is engaged therewith at 22. It will be appreciated that as the clamping screw 17 is tightened, the intermediate portion 12 will fulcrum at 27, thereby urging the looped end 14 generally axially inwardly into the tire side wall. In so doing, a bulge 28 will be formed in the tire within the confines of the looped end, as shown in Figure 4.

The wheel can be rotated so that the weight of the vehicle is borne on the lug to thereby depress the lug further into the tire. The screw is then easily further tightened to hold the thus formed tire bulges.

In addition to the bulge created in the side wall of the tire by the action of the looped end as the cleat is tightened, a second bulge 29 will be formed between the spaced straps 18 and 19 in the tread portion 30 of the tire (Fig. 4).

The bulges formed in the tire by the cleat will together greatly deter any tendency of the clamp to slip either circumferentially or diagonally with respect to the tire in response to the tremendous impact which can be developed.

The bulge-forming means as employed by the instant tire cleat is highly important, since the loop or bight of the cleat which surrounds the bulge 28, on the side wall of the tire cannot readily slide over this tire bulge, which thereby prevents the cleat from coming off. Likewise, the bulge 29 between the two strips identified by the numerals 18 and 19, prevent the cleat from sliding circumferentially around the tire casing.

Not only does the bulge-forming means greatly minimize any propensity of circumferential movement, but in addition, as a result of utilizing an arcuate segment 31 constituting a portion of the loop 14 which depresses a circumferential segment of the tire wall 26, any tendency of the cleat to slip radially or diagonally on the wheel is minimized for the same reason that circumferential movement is restricted.

It will be apparent from the foregoing that it actually is not necessary to have a complete loop in the end of the tire cleat to produce the above mentioned types of bulges to prevent circumferential and radial or diagonal slippage or sliding. For example (Fig. 6), the straps 18a and 19a of the cleat could be separated by a spacer bar 32 and the ends 33, 33 maintained in spaced relationship, as shown in Figure 6, or the ends 34, 34 could be curved in an arc-like manner in the opposite direction, as shown in Figure 7.

Accordingly, it will be appreciated that the wall gripping portions of the cleat may be of any shape which will produce appreciable bulges in the tire casing to prevent the cleat from sliding radially or diagonally and circumferentially relative to the tire casing will accomplish the desired result. In the preferred design a closed loop end is used because of simplicity of manufacture.

In Figure 5 another modification is shown wherein the straps 18b, 19b are in generally parallel relationship to the looped terminal portion 14 and a spacer bar 35 joins the straps and supports the threaded ring portion 36 to hold the clamping screw 37.

In addition to the foregoing basic constructions, we have found that the most satisfactory tire cleat construction has certain more desirable proportions or characteristics in relation to the casing on which it is intended to be used.

These are as follows:

The angle of the clamping screw 17 should be between 30° and 45° with relation to the rim flange 22;

The depth of the strap section should be between .075 and .100 times the nominal tire width. Thus, for a 6.70 x 15 tire, 6.70 being the nominal width, the depth should be between .500 inch and .670 inch; and The space between the straps, measured along the outside diameter and in the center plane of the tire, should be at least four times the depth of the strap.

While the instant tire cleat construction shows the clamping means 11 to be cooperable with the terminal rim flange 22, it could be made cooperable with the tire rim in any desired manner so long as the bulge-forming characteristics are retained.

It will be understood that modifications and variations may be effected without departing from the scope of the novel concepts of the present invention.

I claim as my invention:

1. A C-shaped tire lug for detachable assembly with a tire rim having axially spaced and axially extending annular peripheral lips and a pneumatic tire positioned therebetween having axially facing side walls and a radially outwardly facing tread surface, comprising a terminal clamping portion at one end of the C having a screw extending generally radially for engagement with the radially inwardly facing surface of one of said lips, a pair of C-shaped leg members rigidly secured to said clamping portion and diverging from each other as they extend radially outwardly away from said clamping portion along one side wall and around said tread surface of the tire to the opposite side wall thereof, said legs being bent toward each other at their ends opposite the said clamping portion at the other end of the C engaging the said opposite side wall, and means rigidly securing said legs together adjacent their said opposite ends to provide a bulge-forming bight portion for engagement with the said opposite side wall, said legs comprising rigid material of generally elongated cross-section providing a thin edge facing radially inwardly for edge contact with said tread surface and said opposite side wall of said tire whereby tightening said screw against the radially inwardly facing surface of said one lip draws said lug and hence said thin edge into the said tread surface and said opposite side wall of the tire to deform the tire into a bulge within said bight portion.

2. A C-shaped tire lug constructed in accordance with claim 1 wherein said securing means comprises a bar of rigid material secured to both said legs adjacent the said ends thereof opposite the clamping means.

3. A C-shaped tire lug for detachable assembly with a tire rim having axially spaced and axially extending annular peripheral lips and a pneumatic tire positioned therebetween having axially facing side walls and a radially outwardly facing tread surface, comprising a terminal clamping portion at one end of the C having a screw extending generally radially for engagement with the radially inwardly facing surface of one of said lips, a pair of C-shaped leg members rigidly secured to said clamping portion and diverging from each other as they extend radially outwardly away from said clamping portion along one side wall and around said tread surface of the tire to the opposite side wall thereof, said legs being integral with each other and forming a bight at the end of the C opposite said clamping portion to provide a bulge-forming portion for engagement with the said opposite side wall, said legs comprising rigid material of generally elongated cross-section providing a thin edge facing radially inwardly for edge contact with said tread surface and said opposite side wall of said tire whereby tightening said screw against the radially inwardly facing surface of said one lip draws said lug and hence said thin edge into said tread surface and said opposite side wall of the tire to deform the tire into a bulge within said bight portion.

References Cited in the file of this patent

UNITED STATES PATENTS

| | | |
|---|---|---|
| 1,256,729 | Reese | Feb. 19, 1918 |
| 2,423,759 | Edwards | July 8, 1947 |
| 2,449,033 | Younglove | Sept. 7, 1948 |
| 2,505,711 | Hughes | Apr. 25, 1950 |
| 2,625,194 | Westrate | Jan. 13, 1953 |
| 2,738,820 | Browning et al. | Mar. 20, 1956 |